June 23, 1925.
C. L. GOODRICH
1,543,254
THREAD GAUGE AND METHOD OF MAKING THE SAME
Filed May 28, 1921
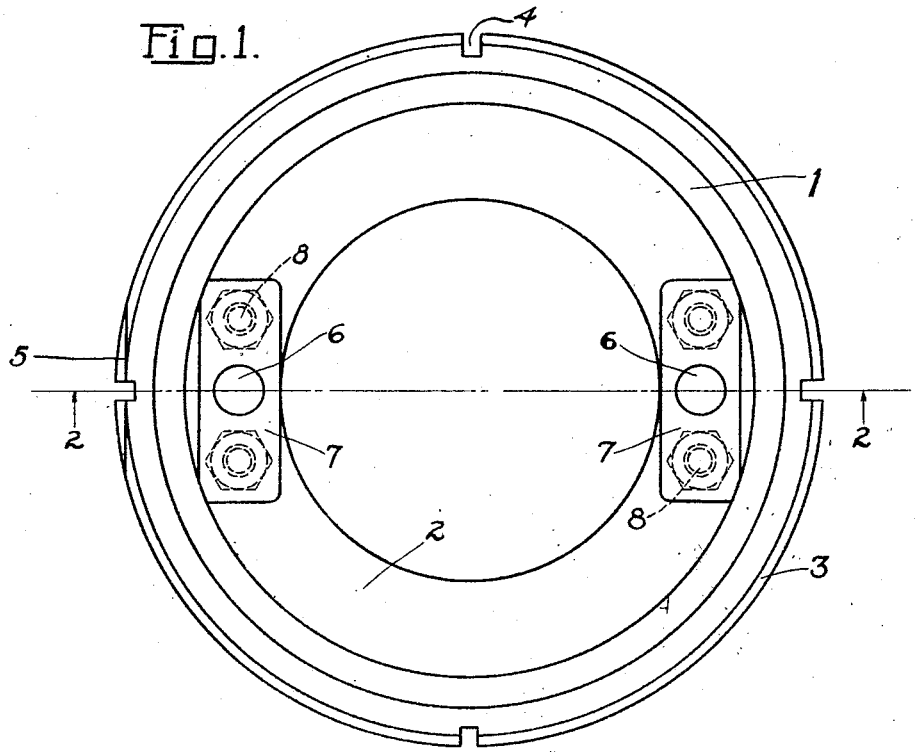
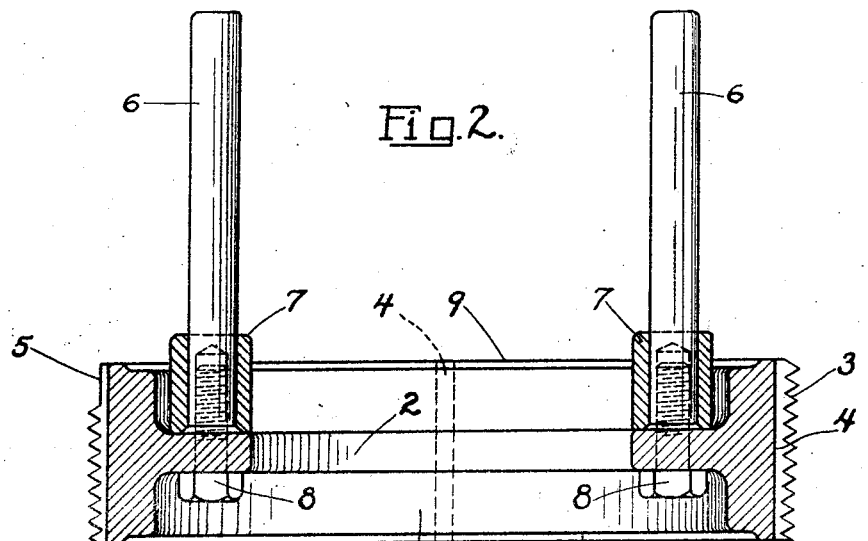
Inventor
C. L. Goodrich
By Joseph K. Schofield
Attorney Patented June 23, 1925.

1,543,254

UNITED STATES PATENT OFFICE.

CLARENCE L. GOODRICH, OF HARTFORD, CONNECTICUT, ASSIGNOR TO PRATT & WHITNEY COMPANY, OF NEW YORK, N. Y., A CORPORATION OF NEW JERSEY.

THREAD GAUGE AND METHOD OF MAKING THE SAME.

Application filed May 28, 1921. Serial No. 473,328.

*To all whom it may concern:*

Be it known that I, CLARENCE L. GOODRICH, a citizen of the United States, residing at Hartford, in the county of Hartford and State of Connecticut, have invented certain new and useful Improvements in Thread Gauges and Methods of Making the Same, of which the following is a specification.

This invention relates to thread gauges and particularly to large pipe thread gauges of the ring type.

The principal object of the invention is to provide a gauge of the above type which will be of comparatively light weight and comparatively easy and cheap to manufacture.

It is an object of the invention to make a gauge of the above type from an alloy steel by first toughening the rough gauge ring by heat treatment and thereafter machining the ring directly to size and forming the gauging thread surfaces therein.

With these and other objects in view my invention consists in the features of construction and operation set forth in the following specification and illustrated in the accompanying drawing. In such drawing annexed hereto and forming a part of this specification, I have shown my invention embodied in a thread gauge of the internal type but it will be understood that the invention may be otherwise embodied and that the drawing is not to be construed as defining or limiting the scope of the invention, the claims appended to this specification being relied upon for that purpose.

Referring to the figures of the drawing:

Figure 1 is a front elevation of an internal thread gauge embodying the present invention.

Fig. 2 is a longitudinal sectional view therethrough on the line 2—2 of Fig. 1.

The usual and general operation of manufacturing thread gauges comprises first the machining of the gauge to form the gauging surfaces therein and to rough finish the same, then subjecting the gauge to a heat treating operation to harden the same and thereafter finishing the gauge by grinding. Thread gauges for large pipes are ordinarily very expensive to manufacture and, being of solid construction, are very heavy. A gauge of this general type is illustrated in U. S. Patent No. 870,286 to B. M. W. Hanson. The present invention aims to provide for manufacturing large ring thread gauges for this purpose, such gauges to be comparatively light in weight and much easier and cheaper to manufacture than those heretofore used. Such a gauge is desirable both because of its light weight and small expense and the method outlined herein provides for manufacturing the same in a comparatively simple and inexpensive manner.

In accordance with the invention, a ring of an alloy or other suitable steel is first heat treated to toughen the same to a hardness sufficient to resist wear but not sufficient to prevent the cutting thereof by machine tools, this hardness usually reaching a Brinell reading of approximately 285, although it will be understood that, in its broad aspect, the invention is not limited in this respect. The ring, after being heat treated, is machined to cut the gauging threads therein and to finish the same in the desired manner. The gauge is ordinarily not hardened after machining since such operation would distort the same, due to its small cross sectional area. One embodiment of the invention showing a gauge for gauging internal threads has been illustrated in the accompanying drawing and will now be described.

In practicing the invention, a steel of the proper analysis, is selected and formed into a ring of the general type illustrated at 1 in the drawing. As illustrated in Fig. 2, this ring is comparatively small in cross section and therefore comparatively light in weight. In a gauge of the internal type illustrated in the drawing, a flange 2 is preferably formed internally of the ring.

The ring is next subjected to a heat treating operation whereby the same is toughened to the desired hardness, the degree of this hardness may be stated as being sufficient to resist wear but not sufficient to prevent the cutting of the ring by machine tools. With steel of the proper analysis, a degree of hardness and toughness for resisting wear which has been found very satisfactory is such as to give a Brinell reading between 250 and 300 approximately. The gauging threads 3 are thereafter cut in the ring and the gauge machined directly to size. It may be desirable in some instances to finish the gauge by grinding the threads thereof, but such operation will not ordinarily be essential since the threads may be finished sufficiently accurate in the machining operation.

It will be seen that the invention provides a ring thread gauge for large pipes wherein the heavy weight and high cost incident to solid gauges of this type are avoided. By heat treating the gauge in the manner specified and thereafter machining the same without further heat treatment thereof, all liability of distorting the gauge after machining, because of its thin cross section, is eliminated.

The threads of the gauge are preferably provided with the usual slots 4 therein and a flat 5 on one side thereof. A pair of handles 6 are secured to lugs 7 bolted to the flange 2 by means of bolts 8, the handles extending laterally outward of the gauge. It should be noted that the lugs 7 extend outwardly of the gauge beyond the edge or face 9 thereof whereby a bar or the like may be placed transversely across the face 9 and engaged with the lugs to rotate the gauge. This latter operation is often necessary when the gauge freezes or becomes stuck in the opening being gauged.

What I claim is:

1. A large thread gauge comprising an integral ring of steel which has been toughened by heat treatment to have a Brinell reading of approximately 285, the gauging surface of the ring being provided with unground screw threads cut therein after the said heat treatment.

2. A large thread gauge comprising an integral steel ring of comparatively small cross section which has been toughened by heat treatment to have a Brinell reading of approximately 285, screw threads formed on a circular surface of the ring, a flange on the ring opposite the threaded portion, and a plurality of handles secured to the flange and extending outwardly of the ring.

3. A large thread gauge comprising an integral steel ring of comparatively small cross section having screw threads formed in the gauging surface of the ring, a pair of elements secured to the gauge and extending longitudinally outward therefrom beyond the edge of the gauge, and a handle secured to each of said elements, the said elements being adapted to be engaged by a bar or the like extending transversely of the gauge for rotating the same.

4. A large thread gauge comprising an integral steel ring of comparatively small cross section having screw threads formed in the outside periphery of the ring, a flange extending inwardly of the ring, and a pair of handles secured to the flange and extending laterally outward of the ring.

In testimony whereof, I hereto affix my signature.

CLARENCE L. GOODRICH.